United States Patent Office 2,799,384
Patented July 16, 1957

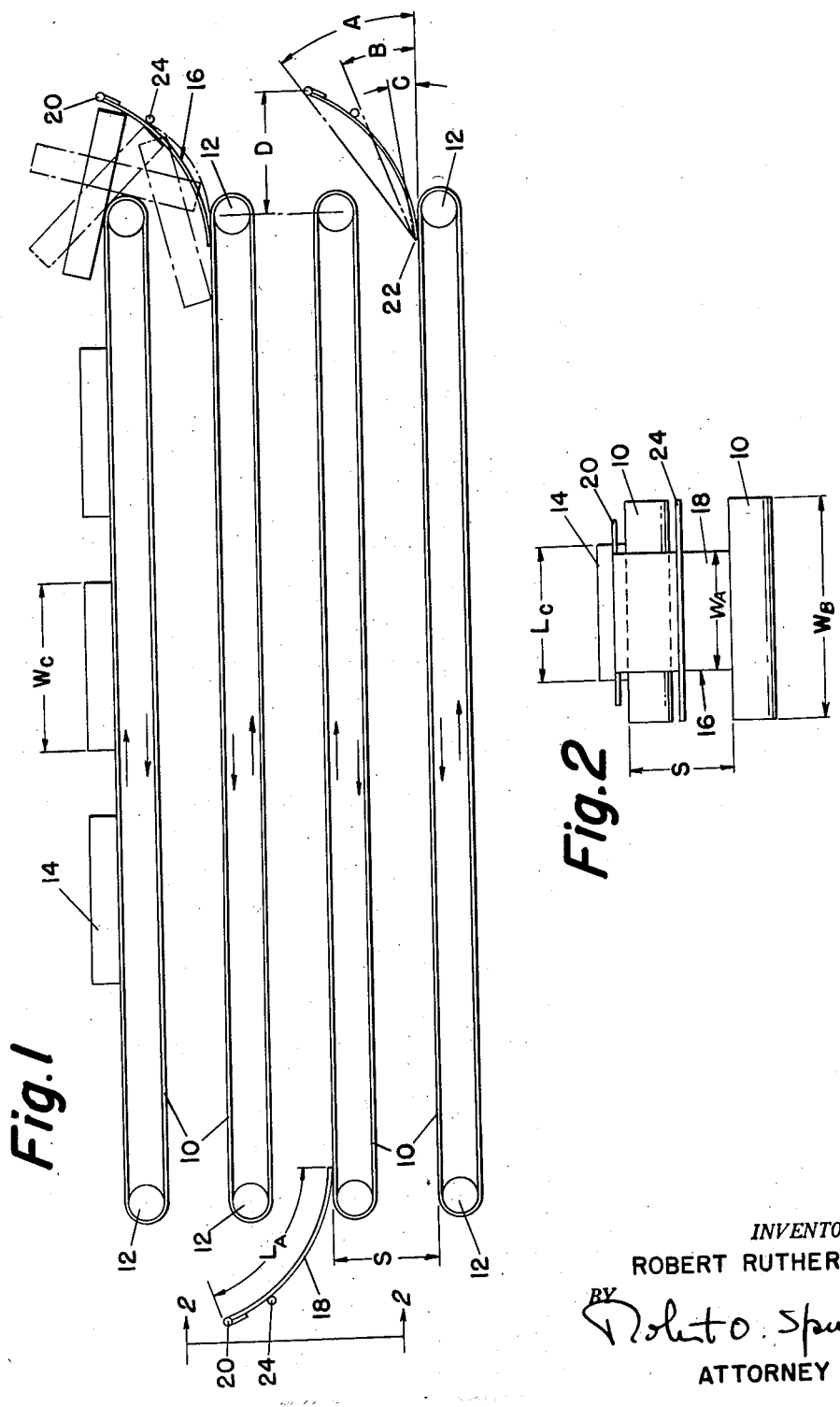

2,799,384

CONVEYOR BELT AND CHUTE MECHANISM

Robert Rutherford, Springfield, Pa., assignor to Sun Oil Company, Philadelphia, Pa., a corporation of New Jersey Application June 9, 1954, Serial No. 435,582

1 Claim. (Cl. 198—45)

The present invention relates generally to materials handling systems, and particularly to conveyors adapted to transport wax cakes through chillers. It was conceived as a solution of problems arising in connection with the cooling of commercially shaped wax cakes resulting from extruding processes as contrasted with the older casting method. The object and nature of the invention may probably best be illustrated by a discussion of the problems giving rise to the here considered improvement.

Consumer purchase of wax requires it to be shaped into rectangular cakes of set dimensions. In the past, molten wax was poured into chilled molds and permitted to stand until solidified. Due to the nature of wax, the exterior rapidly becomes solid, insulating the soft and often liquid interior of the cake, requiring prolonged chilling periods. This chilling period was reduced by shaping the wax cake through extruders instead of casting the cake as described. In this way, wax of much lower temperature could be used in the shaping process.

All the heat is not expelled from the extruder resulting cake, however, and further cooling is necessary before packing. In order to take advantage of the comparatively more rapid production of the extruding method, and to adapt efficient packing methods to this production, direct delivery from the extruder to the package is required. Consequently a chilling step is incorporated between the extruder delivery and the packaging operation.

In the interest of efficiency and economy, the extruded wax cake is passed through the chiller on continuously moving surfaces. Sufficient time is gained in a chiller of practical dimensions by requiring the wax cake to traverse a path of sufficient length to consume the necessary chilling time. It is with this step in the wax cake handling that this application is concerned.

The demands of industry require wax manufacturers to prepare waxes of differing characteristics. For example, waxes of different melting points and textures are required as coatings or ingredients in other products by many industries. The problem of handling wax cakes in the cooling step is therefore further complicated by the type of wax being considered.

Stated concisely, the inclusive problem of properly preparing wax cakes for packaging includes many sub-problems. As above indicated, the length of time in the cooling tunnel or chiller must be considered. Spacing, turning, protecting from damage, easy and continuous passage, considered for all types of commercial waxes, are contributing factors to the solution of the general problem of packaging preparation. It is therefore the primary object of this invention to provide a wax cake handling device for use in the cooling tunnel that will deliver extruded cakes of all types of commercial wax ready for packaging.

In accordance with the present invention, the wax cake is delivered to the cooling tunnel from the extruder usually on continuously traveling belt conveyors. The cakes are received in the cooling tunnel or chiller on the upper of a plurality of continuously traveling belts arranged in tiers, one above the other. After the cake has been carried the full length of the chiller on the topmost belt, it is transferred to the next lower belt moving in the opposite direction and proceeds, successively, over all the belts. It is delivered to the packaging locus from the lowest belt in the succession of belts.

The transfer from one belt to the next lower belt presents the element of the conveyor system which, as part of the conveyor system, discloses the present invention. By spacing and arranging a flexible receiving element or apron of predetermined surface area, and predetermined operating characteristics, at the discharge-receiving ends of successive belts, the desired passage of the wax cake through the chiller is assured.

In order that a better understanding of the invention may be had, reference is made to the following detailed description and the accompanying drawings, in which:

Figure 1 is an elevational view, in diagram, of the combined elements of the device.

Figure 2 is an end elevational view of a section of the device taken on line 2—2 of Figure 1.

The cooling process together with the requirement of constant, even delivery for efficient packaging, combines the principal sub-divisions of the problem requiring consideration. As the wax cakes are moved in the chiller on broad supporting belts to preserve the wax cake shape, it is necessary to turn the cake over for even faster cooling. This handling must be done with minimum burring of the cake edges, no twisting or other distortion and, of course, without breakage.

Further, the wax cake must be delivered at substantially the required commercial weight, which limits abrasion to a minimum. Also abrasion must be avoided as it leaves a deposit of wax on the transfer means which interrupts the wax cake movement by gripping the sliding cake.

Interruption of the desired equi-spaced wax cake delivery must also be avoided in the transfer means itself. It is, therefore, necessary to locate the transfer means properly in relation to the attended carrying belts, determine the operating angle at which the lower belt is engaged, both empty and with different positions of a moving cake; the dimensions of length and width of the transfer device; and the rigidity and surface frictional coefficient of the material used. All these characteristics enter into the solution of the problem.

In the drawings, where like elements are designated by like numerals, Figure 1 illustrates an elevational view of several tiers of continuously and oppositely moving belts 10 as they are arranged in a cooling tunnel. As the invention here applies generally to a conveyor system combination and, specifically, to the transfer means adapted to move rectangularly shaped objects, wax cakes of our problem, and does not include the cooling tunnel as part of the combination, the tunnel is not shown. The belts 10 are shown engaging end rollers 12 which support and drive the belts in directions indicated by the arrows. All other details of supports, drivers, idlers and the like necessary to conveyor systems in general, are omitted for clarity.

The top tier of belts 10 is shown supporting a number of wax cakes 14 in spaced relation as they move to the transfer means 16 at the delivery end. At this point, the various positions assumed by one wax cake 14 as it is transferred from the top tier to the next one below, are shown in phantom lines. Further, the changes in position of the flexible transfer member or apron 18 as it is deformed in assisting the transfer and reversal of the cake is shown in phantom line.

The second, third and fourth tiers, and there may be as many more as required, or limited by height of the chiller, are shown free of carried objects (14) in order to clarify the explanation of the transfer means 16. It will be understood that actual operation will require all belts comprising the several tiers to be transporting the wax cakes of our problem at spaced intervals for economical reasons. Further, it will be evident that every belt in the system may be both a "feeding" or a "fed" belt, and each has a "receiving" and "discharge" end depending on the movement of the supported items.

A positioning rod 20 is positioned distance D from the center line of roller 12 of the feeding belt 10. This distance D is greater than one-half the cake dimension parallel to the belt 10 designated as Wc to insure the downward movement of the cake as it moves over the roller 12. Yet this distance cannot be so great as to allow the cake or other transported object to drop any appreciable distance.

Depending from the positioning rod 20, the apron 18 is made of a length $L_A$ to extend onto the face of the belt it feeds and not be moved off by pressure of the moving cakes. In the handling of cakes of wax discussed here, belting material is adopted as suitable for the apron 18 because of its deformable flexibility in receiving the wax cake. Yet it is sufficiently rigid to remain in place between the feeder and the fed belts it attends. By adding a rod 24 at a point between the ends of the transfer means 16, a more flexible material can be used, permitting greater deformation of the surface in cushioning the wax cake transfer, without displacing the apron 18 from operating position. The use or omission of the additional rod 24, termed a "support" rod to distinguish it from the "positioning" rod 20, is determined by the dimensions of the moved product, rigidity of selected apron material, initial spacing of conveyor surfaces, and speed of desired operation. All these necessary operating characteristics affect the necessary flexible-rigidity qualities necessary in the apron 18 which are obtained by proper selection of material as well as control of the effective length $L_A$ and width $W_A$.

Further, the angle of contact and the changes in that angle, as noted in Figure 1 between the third and fourth tiers, are important operational factors; and depend on these flexible-rigidity, or deformation qualities. The angle A is the construction angle determined by placement of positioning rod 20 and the delivery edge of the apron 18 with the fed belt 10. Angle B is the average angle which apron 18 forms with the fed belt and is assumed in an unloaded condition. The angle lettered C is the delivery angle made by the weight of the transferred article as it slides to the lower belt at maximum deformation, and is affected by the dimensions, type of apron material, and the use of support rod 24 as described above. It will be evident that the engaging end 22 of the apron must be free to slip forward and backward on the fed belt, yet remain always in contact and never be subject to sliding off. This is facilitated, also, by the direction of movement of the fed belt as it always moves away from the apron 18, and not toward it.

It will be evident that selection of the material from which apron 18 is constructed and properly placing a calculated length in relation to the successive belts will meet the above requirements. As shown, the support rod 24 or other means may be used to assist in proper operation. Proper consideration of these factors will also result in maintaining proper spacing during movement of the wax cakes. If the flexibility and rigidity are properly balanced, i. e. the "deformation" quality, it will be impossible for the wax cake to stop or be interrupted by the transfer means during the turn-over and transfer. This does not, however, control sticking either as the result of friction or by constant transfer of wax to an abrading surface.

In the instance of constant "rub-off" of wax finally accumulating to block the cake transfer, this can be avoided by proper selection of the apron surface. The problem of obstructing the operation by friction, in addition to proper selection of the contact surface, can be further controlled by limiting the operating area of the apron 18. Figure 2 shows a comparison between the dimensions of the conveyor belt 10 ($W_B$), the wax cake 14 ($L_C$) and the apron 18 ($W_A$). As an illustration of the effect of variation of dimension and surface texture on the operation of the device, the wax cake length ($L_C$) and apron width $W_A$ were tried at the same size. Further, the material of the apron, as later indicated, to obtain flexibility was chosen from impregnated fabric belting having a coefficient of friction rating between .25 and .28. In this instance the wax cake, depending on the temperature which varies from entrance to exit in the chiller, had a coefficient of friction between .3 and .4. Under these circumstances the cake movement at the transfer points was retarded too much, resulting in unequal spacing and general unsatisfactory operation. By reducing the width of the apron ($W_A$) relative to the wax cake length ($L_C$) the retarding effect was diminished and proper operation established. Operation under these adjusted conditions will be described in greater detail later.

Before discussing the operation of the device above described, it will be evident that there can be a different arrangement, different dimensions and different materials selected for every kind of object handled. For example, the successive tiers of conveyor belts 10 may be arranged in staggered relation instead of aligned as shown. In such an arrangement the receiving end of the next lower or fed belt could be extended beyond the discharge end of the upper or feeding belt. Further, in the problem of moving wax cakes through a chiller which is the particular but not exclusive use of the disclosed device, there can also be many different kinds of wax. Technically these would require different treatment. Practically, however, one set of dimensions and physical characteristics has been adopted which meets all requirements satisfactorily. This solution for wax cakes, generally, will be described as an example of the use of this device in discussing the operation.

As has been indicated, the wax cakes 14 are delivered to the upper tier of continuously moving belts (in a chiller) as they come from an extruder. In order to be exposed to the effects of the cold surroundings for the necessary time, these cakes are moved, slowly, from the receiving end of the belts to the discharge end. At the end of the upper reach or end of the feeding belt, the cake is extended over the roller 12 until it falls over into contact with the apron 18. The flexible-deformability of the apron 18 causes it to give way before the pressure of the wax cake assuming the phantom lines of the drawing. Where support rod 24 is used to break the operating span of the apron 18 and to insure positioning these members against slippage from the ends of the moving belts 10, the rod 24 is spaced to present a flexible portion of apron 18 to the initial and final turn-over impacts missing the rod supported area. Then by limiting the surface dimensions and selecting an impregnated fabric belting material to reduce abrasion and friction, the cake slides and is turned over. It continues to settle, slowly, flattening itself and the apron until it is engaged by the operating reach of the succeeding belt for continued movement through the chiller, being accomplished without undue abrasion or impact.

It is desirable to maintain a regulated spacing between the cakes as well as turning them over for each tier of belts to aid in reducing their temperature. As the cakes are uniform in weight, shape and material, this is accomplished by selection of transfer means of uniform characteristics to operate between belt tiers. Consequently, the spacing for help in cooling, as well as ease in packaging, tends to remain uniform throughout the operation.

From the above description, it will be seen that a conveyor system constructed according to this invention is of an extremely simple, and comparatively inexpensive nature, and is particularly well adapted for use in the example given and like situations. It will also be obvious from the above description that the device is susceptible of modifications without material departure from the principles and spirit of the invention and is to be limited only by the scope of the following claim.

What is claimed is:

In wax cake conveyor systems where a plurality of conveyor belts are arranged vertically above each other and adapted to successively move in opposite directions providing an extended travel distance in limited space, an improved transfer means connecting the successive discharge and receiving ends of adjacent belts comprising an apron of flexible material the lower end extended into contact with the lower of said belts, a positioning rod to hold the upper end of the apron aligned with the discharge belt and transverse thereto, being horizontally spaced therefrom to allow the wax cake to extend beyond its center before engaging the apron, and supporting means between the belts holding the apron in operating position against the movement of the wax cakes.

References Cited in the file of this patent

UNITED STATES PATENTS

| | | |
|---|---|---|
| 240,581 | Edwards | Apr. 26, 1881 |
| 456,336 | Paris | July 21, 1891 |
| 1,297,926 | Starr | Mar. 18, 1919 |
| 2,006,091 | Walter | June 25, 1935 |
| 2,673,652 | Steadman | Mar. 30, 1954 |